(12) United States Patent
Herdendorf et al.

(10) Patent No.: US 11,094,347 B1
(45) Date of Patent: Aug. 17, 2021

(54) SPLIT RAMP FOR DATA STORAGE DEVICES

(71) Applicant: Seagate Technology LLC, Fremont, CA (US)

(72) Inventors: Brett R. Herdendorf, Mound, MN (US); Ronald E. Anderson, Minneapolis, MN (US); Wolfgang Rosner, Burnsville, MN (US); Riyan Alex Mendonsa, Edina, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/863,287

(22) Filed: Apr. 30, 2020

(51) Int. Cl.
| | |
|---|---|
| *G11B 21/22* | (2006.01) |
| *G11B 21/24* | (2006.01) |
| *G11B 21/08* | (2006.01) |
| *G11B 5/54* | (2006.01) |
| *G11B 21/12* | (2006.01) |
| *G11B 21/16* | (2006.01) |

(52) U.S. Cl.
CPC ............. *G11B 21/24* (2013.01); *G11B 5/54* (2013.01); *G11B 21/08* (2013.01); *G11B 21/12* (2013.01); *G11B 21/16* (2013.01); *G11B 21/22* (2013.01)

(58) Field of Classification Search
None
See application file for complete search history.

(56) References Cited

U.S. PATENT DOCUMENTS

| | | |
|---|---|---|
| 3,311,902 A | 3/1967 | Appleton |
| 3,940,794 A | 2/1976 | Griffiths et al. |
| 4,164,767 A | 8/1979 | Gyi et al. |
| 4,208,685 A | 6/1980 | Matla et al. |
| 4,566,087 A | 1/1986 | Kraft |
| 4,742,410 A | 5/1988 | Smith |
| 4,839,756 A | 6/1989 | Chew et al. |
| 4,884,261 A | 11/1989 | Dalziel |
| 4,888,751 A | 12/1989 | Yoshimaru et al. |
| 5,023,737 A | 6/1991 | Yaeger |

(Continued)

FOREIGN PATENT DOCUMENTS

WO     2020018854 A1     1/2020

OTHER PUBLICATIONS

Non-Final Rejection for U.S. Appl. No. 16/805,174, dated Sep. 25, 2020, 7 pages.

(Continued)

*Primary Examiner* — Jefferson A Evans

(74) *Attorney, Agent, or Firm* — Westman, Champlin & Koehler, P.A.

(57) ABSTRACT

A data storage device includes at least one head supported by an actuator arm. The at least one head interacts with the at least one data storage disc when positioned over the at least one data storage disc. The data storage device further includes a split ramp for supporting the at least one head when the at least one head is moved away from the at least one data storage disc. The split ramp has a first ramp portion adjacent to a first outer diameter (OD) of the at least one data storage disc and a second ramp portion adjacent to the first ramp portion, such that the first ramp portion is between the second ramp portion and the first OD. At least one of the first ramp portion or the second ramp portion is independently moveable.

19 Claims, 7 Drawing Sheets

(56) References Cited

U.S. PATENT DOCUMENTS

| | | |
|---|---|---|
| 5,283,705 A | 2/1994 | Iwabunchi |
| 5,293,282 A | 3/1994 | Squires et al. |
| 5,307,224 A | 4/1994 | Minase |
| 5,341,260 A | 8/1994 | Jabbari |
| 5,343,347 A | 8/1994 | Gilovich |
| 5,347,414 A | 9/1994 | Kano |
| 5,459,921 A | 10/1995 | Hudson et al. |
| 5,467,238 A | 11/1995 | Lee et al. |
| 5,550,695 A | 8/1996 | Matsumoto |
| 5,764,437 A | 6/1998 | Meyer et al. |
| 5,831,795 A | 11/1998 | Ma et al. |
| 5,973,886 A | 10/1999 | Khuu |
| 5,973,887 A | 10/1999 | Cameron |
| 5,995,332 A | 11/1999 | Patterson |
| 5,999,351 A | 12/1999 | Albrecht et al. |
| 6,005,747 A | 12/1999 | Gilovich |
| 6,055,134 A | 4/2000 | Boutaghou |
| 6,067,208 A | 5/2000 | Segar |
| 6,081,399 A | 6/2000 | Lee et al. |
| 6,091,576 A | 7/2000 | Eckerd et al. |
| 6,115,214 A * | 9/2000 | Allsup ............... G11B 21/22 360/128 |
| 6,122,130 A | 9/2000 | Boutaghou et al. |
| 6,134,076 A | 10/2000 | Boutaghou et al. |
| 6,157,520 A | 12/2000 | Mangold et al. |
| 6,160,686 A | 12/2000 | Albrecht et al. |
| 6,201,666 B1 | 3/2001 | Resh |
| 6,275,356 B1 | 8/2001 | Boutaghou et al. |
| 6,278,584 B1 | 8/2001 | Zhang et al. |
| 6,344,950 B1 * | 2/2002 | Watson ............... G11B 5/54 360/254.3 |
| 6,404,580 B1 | 6/2002 | Fioravanti |
| 6,449,129 B1 | 9/2002 | Macpherson et al. |
| 6,452,753 B1 | 9/2002 | Hiller et al. |
| 6,473,268 B2 * | 10/2002 | Simozato ............ G11B 21/12 360/254.3 |
| 6,473,270 B1 | 10/2002 | McDonald et al. |
| 6,480,361 B1 | 11/2002 | Patterson |
| 6,487,050 B1 | 11/2002 | Liu |
| 6,490,135 B1 | 12/2002 | Sannino et al. |
| 6,507,460 B2 | 1/2003 | Fayeulle et al. |
| 6,519,115 B1 | 2/2003 | Yaeger |
| 6,577,473 B1 | 6/2003 | MacPherson et al. |
| 6,597,540 B2 | 7/2003 | Tsuda et al. |
| 6,621,651 B1 | 9/2003 | Ratliff et al. |
| 6,650,506 B1 | 11/2003 | Risse |
| 6,693,773 B1 | 2/2004 | Sassine |
| 6,710,964 B1 | 3/2004 | Rao et al. |
| 6,775,107 B2 | 8/2004 | Kasajima et al. |
| 6,847,504 B1 | 1/2005 | Bennett et al. |
| 6,855,282 B2 | 2/2005 | Fayeulle et al. |
| 6,952,319 B2 | 10/2005 | Weiehelt et al. |
| 6,989,965 B2 | 1/2006 | Mundt et al. |
| 7,102,842 B1 | 9/2006 | Howard |
| 7,385,781 B1 | 6/2008 | Craig et al. |
| 7,548,399 B2 | 6/2009 | Shin |
| 7,593,192 B1 * | 9/2009 | Rappel ............... G11B 5/54 360/255 |
| 7,672,083 B1 | 3/2010 | Yu et al. |
| 7,675,712 B2 | 3/2010 | Liu et al. |
| 7,733,610 B2 | 6/2010 | Scura et al. |
| 7,813,078 B1 | 10/2010 | Gleason et al. |
| 7,848,057 B1 * | 12/2010 | Shukla ............... G11B 21/22 360/254.3 |
| 7,986,491 B2 | 7/2011 | Albrecht et al. |
| 8,024,853 B2 | 9/2011 | Rivera |
| 8,035,913 B2 | 10/2011 | Kim et al. |
| 8,112,580 B2 | 2/2012 | Bandic et al. |
| 8,194,345 B2 | 6/2012 | Kwon et al. |
| 8,208,215 B2 | 6/2012 | Molaro et al. |
| 8,493,690 B1 | 7/2013 | Ono et al. |
| 8,824,094 B1 | 9/2014 | Furlong et al. |
| 8,873,200 B2 | 10/2014 | Warn et al. |
| 8,958,172 B1 | 2/2015 | Hansen |
| 8,958,173 B1 | 2/2015 | Hirano et al. |
| 9,025,277 B1 | 5/2015 | Hirano |
| 9,171,560 B1 | 10/2015 | Davidson et al. |
| 9,183,862 B1 * | 11/2015 | Shah ............... G11B 5/4806 |
| 9,218,833 B1 | 12/2015 | Shah et al. |
| 9,449,649 B1 | 9/2016 | Rejae et al. |
| 9,536,552 B1 | 1/2017 | Chen et al. |
| 9,552,835 B1 * | 1/2017 | Tamayo ............... G11B 5/5521 |
| 9,704,521 B1 | 7/2017 | Shah et al. |
| 10,269,380 B1 | 4/2019 | Sun et al. |
| 10,622,012 B1 | 4/2020 | Tu et al. |
| 10,803,891 B1 * | 10/2020 | Jacoby ............... G11B 5/531 |
| 2001/0033459 A1 * | 10/2001 | Boutaghou ............ G11B 21/22 360/254.3 |
| 2005/0280945 A1 | 12/2005 | Duvall et al. |
| 2005/0286171 A1 | 12/2005 | Kim et al. |
| 2006/0002028 A1 | 1/2006 | Nayar et al. |
| 2006/0117558 A1 | 6/2006 | Koh et al. |
| 2006/0171078 A1 | 8/2006 | Kajitani |
| 2006/0256478 A1 | 11/2006 | Hayakawa |
| 2009/0279199 A1 | 11/2009 | Zhang |
| 2010/0091408 A1 | 4/2010 | Albrecht et al. |
| 2010/0246053 A1 * | 9/2010 | Satou ............... G11B 21/22 360/75 |
| 2011/0038074 A1 | 2/2011 | Viskochil et al. |
| 2012/0002328 A1 | 1/2012 | Aoki et al. |
| 2012/0075750 A1 | 3/2012 | Chan et al. |
| 2014/0126084 A1 | 5/2014 | Nakamiya et al. |
| 2019/0295576 A1 * | 9/2019 | Nagata ............... G11B 5/54 |
| 2019/0333533 A1 | 10/2019 | Mendonsa et al. |
| 2020/0027477 A1 | 1/2020 | Garbarino |
| 2020/0027480 A1 | 1/2020 | Myers et al. |
| 2021/0075750 A1 * | 3/2021 | Yoo ............... G06Q 30/016 |

OTHER PUBLICATIONS

Prior Art Database Technical Disclosure, IP.com No. IPCOM000228512D, "Retracting Load/Unload Ramp", https://ip.com/IPCOM/000228512, dated Jun. 14, 2013, 6 pages.

Notice of Allowance (PTOL-85) for U.S. Appl. No. 15/965,097, dated Sep. 22, 2020, 6 pages.

Restriction Requirement for U.S. Appl. No. 15/946,859, dated May 19, 2020, 8 pages.

Maplesoft Application Brief, "Optimal Control Design of a Voice Coil Head Actuator in a Hard Drive", www.maplesoft.com/appsbriefs, dated 2008, 30 pages.

World's first commercial Hard Drive—IBM 350 (RAMAC); https://www.youtube.com/watch?v=aTkL4FQL2FI; Nov. 27, 2016; 5 pages.

Notice of Allowance for U.S. App. No. 15/965,097, dated May 20, 2020, 6 pages.

Final Office Action for U.S. Appl. No. 15/965,097, dated Mar. 11, 2020, 8 pages.

Non-Final Office Action for U.S. Appl. No. 15/965,097, dated Jul. 13, 2020, 6 pages.

Application and Drawings for U.S. Appl. No. 16/805,174, dated Feb. 28, 2020, 40 pages.

Non-Final Office Action for U.S. Appl. No. 15/965,097, dated Nov. 21, 2019, 7 pages.

Non-Final Office Action for U.S. Appl. No. 15/965,097, dated Apr. 12, 2019, 7 pages.

Notice of Allowance and Fee(s) Due for U.S. Appl. No. 16/805,174, dated Jan. 11, 2021, 6 pages.

* cited by examiner

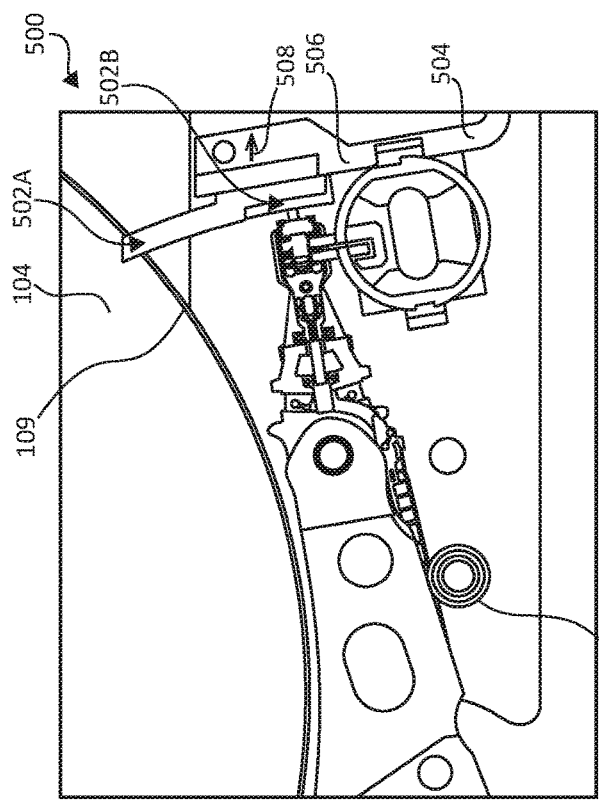
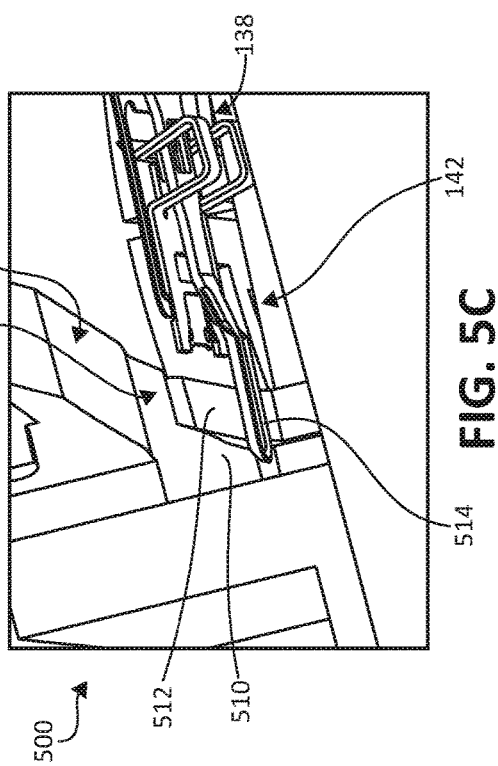
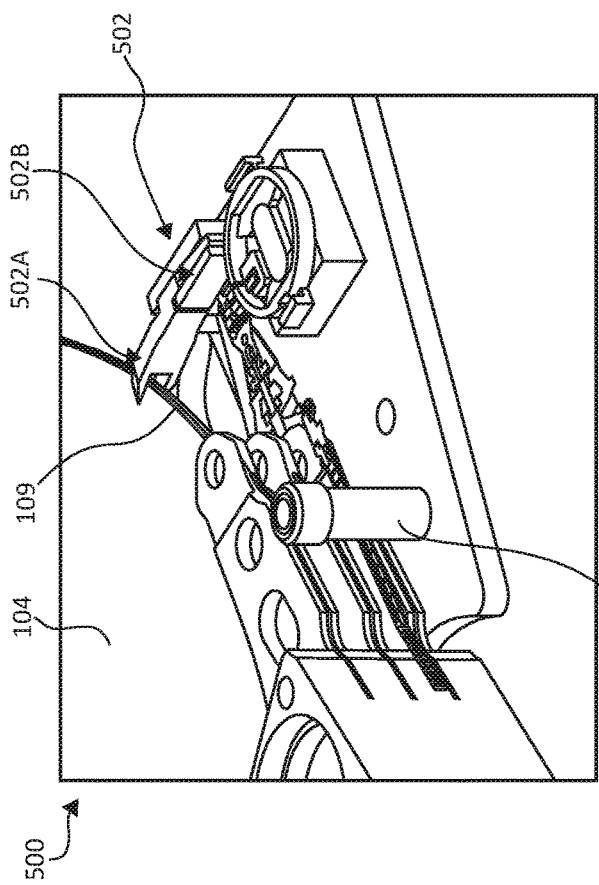
FIG. 5B
FIG. 5C
FIG. 5A

SPLIT RAMP FOR DATA STORAGE DEVICES

SUMMARY

In one embodiment, a data storage device is provided. The data storage device includes at least one head supported by an actuator arm. The at least one head is configured to interact with at least one data storage disc when positioned over the at least one data storage disc. The data storage device further includes a split ramp for supporting the at least one head when the at least one head is moved away from the at least one data storage disc. The split ramp has a first ramp portion adjacent to a first outer diameter (OD) of the at least one data storage disc and a second ramp portion adjacent to the first ramp portion, such that the first ramp portion is between the second ramp portion and the first OD. At least one of the first ramp portion or the second ramp portion is independently moveable.

In another embodiment, a data storage device is provided. The data storage device includes a split ramp having a plurality of ramp portions for supporting at least one head. At least one ramp portion of the plurality of ramp portions is independently moveable.

In yet another embodiment, a method is provided. The method includes providing a split ramp having a plurality of ramp portions for supporting at least one head. The method also includes enabling at least one ramp portion of the plurality of ramp portions to be independently moveable.

Other features and benefits that characterize embodiments of the disclosure will be apparent upon reading the following detailed description and review of the associated drawings.

BRIEF DESCRIPTION OF THE DRAWINGS

FIGS. 5A-5C are diagrammatic illustrations of a portion of a data storage device that employs a split ramp in accordance with one embodiment.

DETAILED DESCRIPTION OF ILLUSTRATIVE EMBODIMENTS

Embodiments of the disclosure relate to a split ramp mechanism for use in a data storage device (e.g., a hard disc drive (HDD)).

In general, in order to keep read/write heads from landing on one or more discs in the HDD when, for example, power is removed from the HDD, a head-support ramp is provided adjacent to an outer diameter (OD) of the disc or discs. In current HDDs, a number of heads is equal to a number of disc surfaces, and the heads are rotated for positioning over their corresponding disc surfaces. There is no up/down movement of the heads in such HDDs. However, in a newly designed "elevator" drive, for example, the number of heads employed is less than the number of disc surfaces, and a head stack assembly (HSA) including the fewer number of heads is moved up/down to enable a same head to read from multiple disc surfaces. The up/down movement is possible when the HSA is rotated such that the heads are away from the discs and are supported on a ramp. Currently, ramps are a single unit with an edge of the ramp over the OD of the discs. This ramp design prevents up/down movement of the ramp along with the HSA because the edge of the ramp over the OD may collide with the discs during up/down movement of the ramp.

To address this above-noted problem, embodiments of the disclosure employ a split ramp including a stationary or fixed ramp portion adjacent to the OD of the discs and a moveable ramp portion that is adjacent to the stationary ramp portion. The arrangement is such that the stationary ramp portion is between the moveable ramp portion and the OD of the discs. To enable up/down movement of the HSA, the HSA is first rotated away from the discs and away from the stationary ramp portion, and positioned such that the heads are supported on the moveable portion of the ramp. Then, the HSA and the moveable portion of the ramp are moved in unison by an elevator in the HDD.

In another embodiment, a split ramp may include a first ramp portion that is adjacent to the OD of the discs and a second ramp portion that is adjacent to the first ramp portion, such that the first ramp portion is between the second ramp portion and the OD. In this embodiment, the first ramp portion can be rotated away from the disc(s) to enable replacement of one or more discs. When the first portion is rotated away from the discs, the HSA is positioned such that the heads are supported on the second ramp portion. In such embodiments, the second ramp portion may be fixed/stationary if the number of heads is equal to the number of disc surfaces and, thus, no up/down movement takes place. When the number of heads is less than the number of discs, the second portion is configured to be moved up/down. Thus, in one embodiment, the first ramp portion is configured to be rotated and the second ramp portion is configured to be moved up/down. Details regarding the different embodiments are provided below in connection with FIGS. 1-6.

Figure 1:
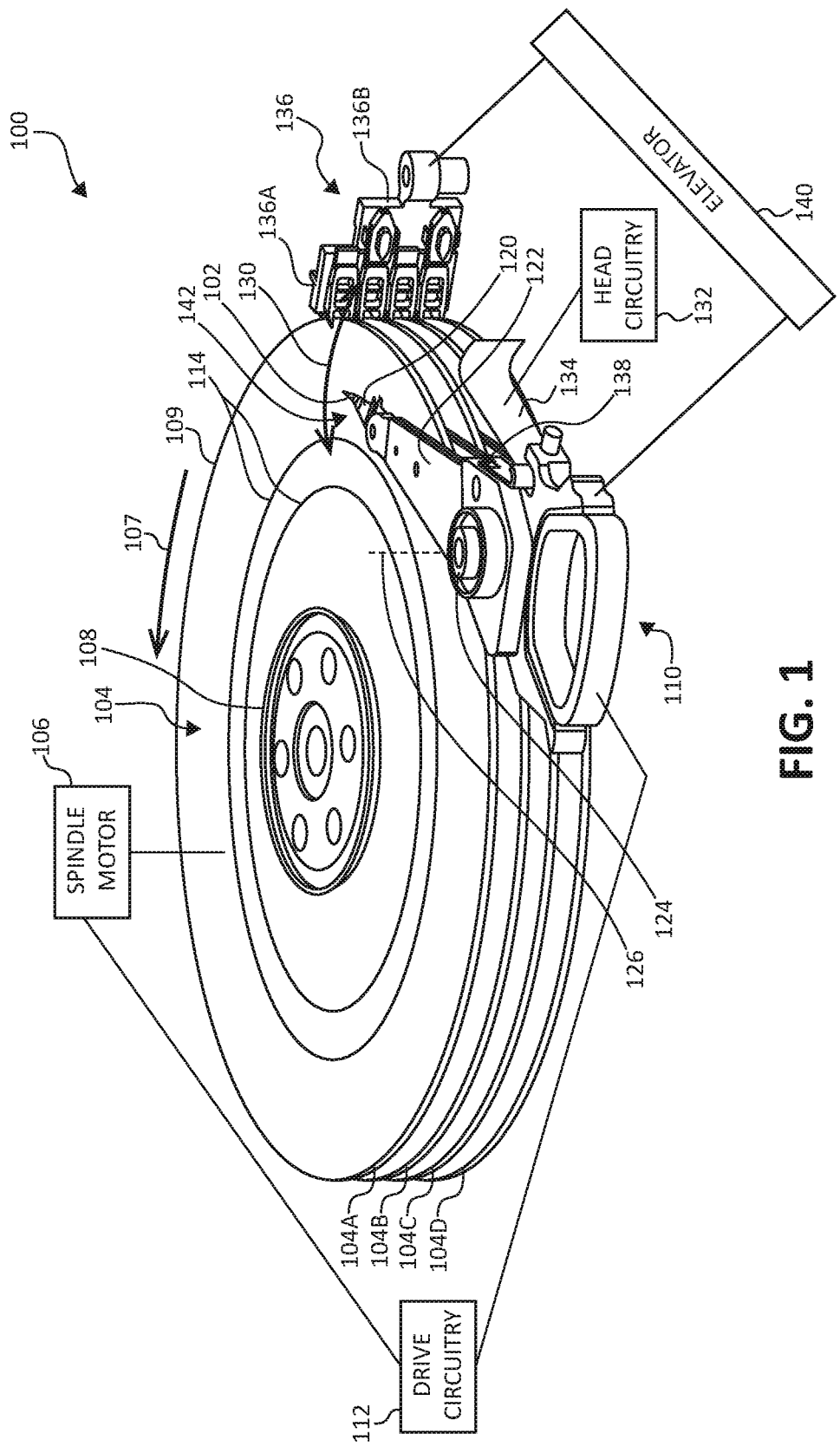
FIG. 1 is a schematic illustration of a data storage device including data storage media, heads for reading data from and/or writing data to the data storage media, and a split ramp for supporting the heads in accordance with one embodiment.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third"

elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including data storage media, heads for reading data from and/or writing data to the data storage media and a split ramp for supporting the heads. In data storage device 100, heads 102 may be positioned over storage media 104 to read data from and/or write data to the data storage media 104. In the embodiment shown in FIG. 1, the data storage media 104 are rotatable data storage discs, with each disc 104 having opposing surfaces that serve as data storage surfaces. For read and write operations, a spindle motor 106 (illustrated schematically) rotates the media 104 as illustrated by arrow 107 and an actuator mechanism 110 positions the heads 102 relative to data tracks 114 on the rotating media 104 between an inner diameter (ID) 108 and an outer diameter (OD) 109. Both the spindle motor 106 and actuator mechanism 110 are connected to and operated through drive circuitry 112 (schematically shown). Each of heads 102 is coupled to the actuator mechanism 110 through a suspension assembly which includes a load beam 120 connected to an actuator arm 122 of the mechanism 110 for example through a swage connection. The actuator mechanism 110 is rotationally coupled to a frame or deck (not shown) through a bearing 124 to rotate about axis 126. Rotation of the actuator mechanism 110 moves the heads 102 in a cross-track direction as illustrated by arrow 130. Each of the heads 102 includes one or more transducer elements (not shown) coupled to head circuitry 132 through flex circuit 134.

As indicated above, in general, in order to keep read/write heads 102 from landing on discs 104 in a data storage device 100 when, for example, power is removed from the data storage device 100, and to prevent the heads 102 from colliding with outer edges of the discs 104 during load and unload operations, a head-support ramp 136 is provided adjacent to the OD 109 of the discs 104. In data storage device 100, a number of heads 102 is less than a number of disc 104 surfaces. In the particular embodiment shown in FIG. 1, data storage device 100 includes 4 discs, with a total of 8 data storage surfaces, and 4 heads 102. As noted above, each of the 4 heads 102 is coupled to the actuator mechanism 110 through a suspension assembly which includes a load beam 120 connected to an actuator arm 122. The actuator mechanism 110, the load beams 120 and the actuator arms 122 are collectively referred to as the HSA.

In data storage device 100 of FIG. 1, the HSA, which is denoted by reference numeral 138, may be moved along axis 126 between an upper position and a lower position with the help of an elevator 140, which is schematically shown in FIG. 1. In the upper position shown in FIG. 1, the 4 heads interact with data storage surfaces of discs 104A and 104B. In the lower position (not shown), the same 4 heads interact with data storage surfaces of discs 104C and 104D.

As indicated earlier, in order to enable the up/down movement of the HSA 138, head-support ramp 136 is designed as a split ramp with a stationary portion 136A and moveable portion 136B. In order to move the HSA 138 from either the upper position to the lower position or from the lower position to the upper position, the HSA 138 is first rotated about axis 126 until a head end 142 of the HSA 138 is supported on the moveable portion 136B of the head-support ramp 136. Then, the HSA 138 and the moveable portion 136B are moved in unison along axis 126 by the elevator 140. Details regarding one embodiment of elevator 140 are provided below in connection with FIG. 2.

Figure 2:
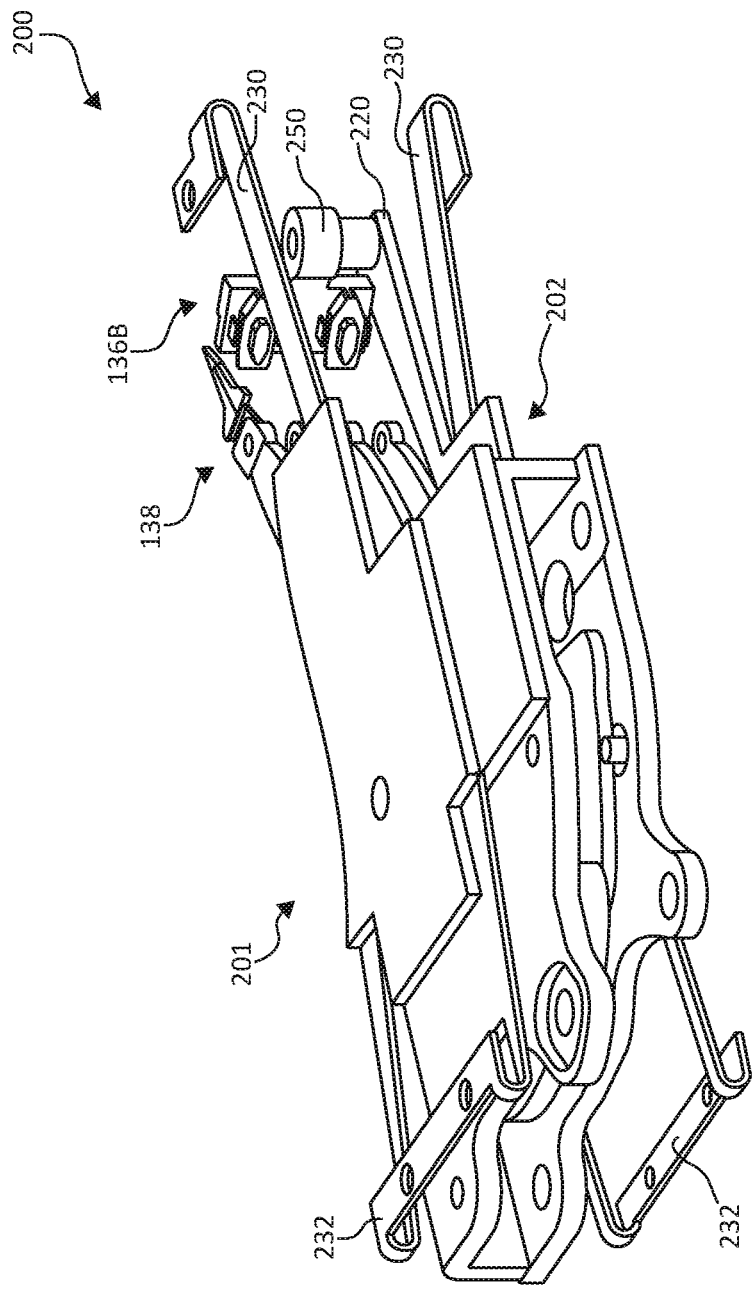
FIG. 2 is a perspective view of an embodiment of an elevator for simultaneously moving a ramp portion and a head stack assembly included in the data storage device of FIG. 1.

FIG. 2 illustrates an embodiment of an elevator 200 for the moveable ramp portion 136B and the HSA 138, allowing them to move in unison. Elevator 200 includes an upper portion 201 and a lower portion 202. In one embodiment, each of portions 201 and 202 has a flexible first end 230 and a flexible second end 232. In general, one or both portions 201 and 202 may be either flexible or floating. The HSA 138 and moveable ramp portion 136B are positioned between the upper portion 201 and the lower portion 202 and are connected together via a base 220 of elevator 200, thereby enabling the HSA 138 and the moveable ramp portion 136B to be moved together. In one embodiment, the elevator base 220 may be driven up and down by a coil and a magnet (not shown) with hard stops at both ends that limit the extent of upward and downward movement of the HSA 138 and the moveable ramp portion 136B. In general, any suitable driving mechanism may be used to move elevator 200 up and down.

In the embodiment illustrated in FIG. 2, the upper limit comprises a stopper 250 arranged with the moveable ramp portion 136B. The flexible first end 230 of the upper portion 201 reaches the stopper 250 of the moveable ramp and halts the upward movement. In the downward direction, the movement may be stopped by the base 220 reaching the flexible first end 230 of the lower portion 202 which halts the progression of the downward movement. This arrangement may be pre-assembled before being placed into a form factor for a disc drive.

Figure 3B:
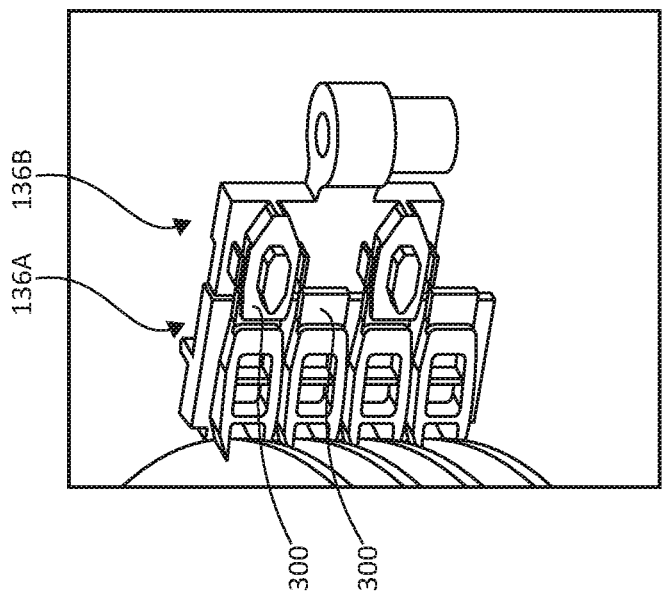
FIGS. 3A and 3B are diagrammatic illustrations showing a moveable ramp portion in different positions.
Figure 3A:
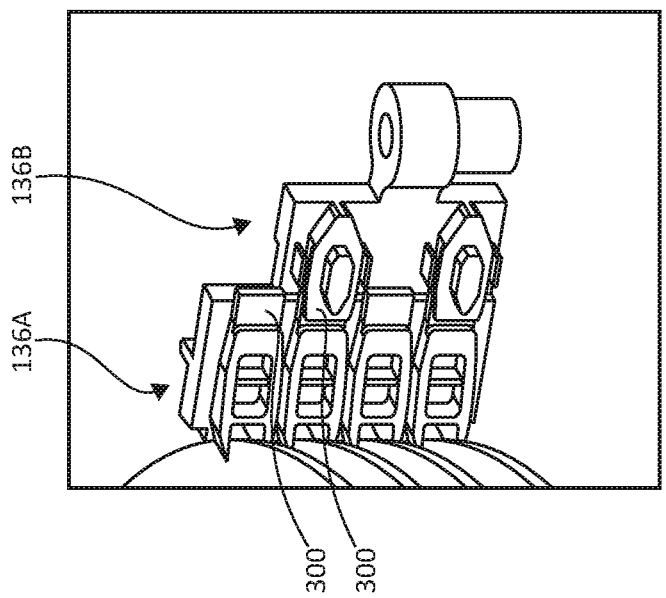

FIGS. 3A and 3B are diagrammatic illustrations showing the moveable ramp portion 136B in a lower position and an upper position, respectively. As can be seen in FIG. 3A, both the stationary ramp portion 136A and the moveable ramp portion 136B include tapers 300 that enable head end 142 of the HSA 138 (not shown in FIGS. 3A and 3B) to smoothly transition between the stationary ramp portion 136A and the moveable ramp portion 136B in both the upper and the lower positions of the moveable ramp portion 136B.

Figure 4A:
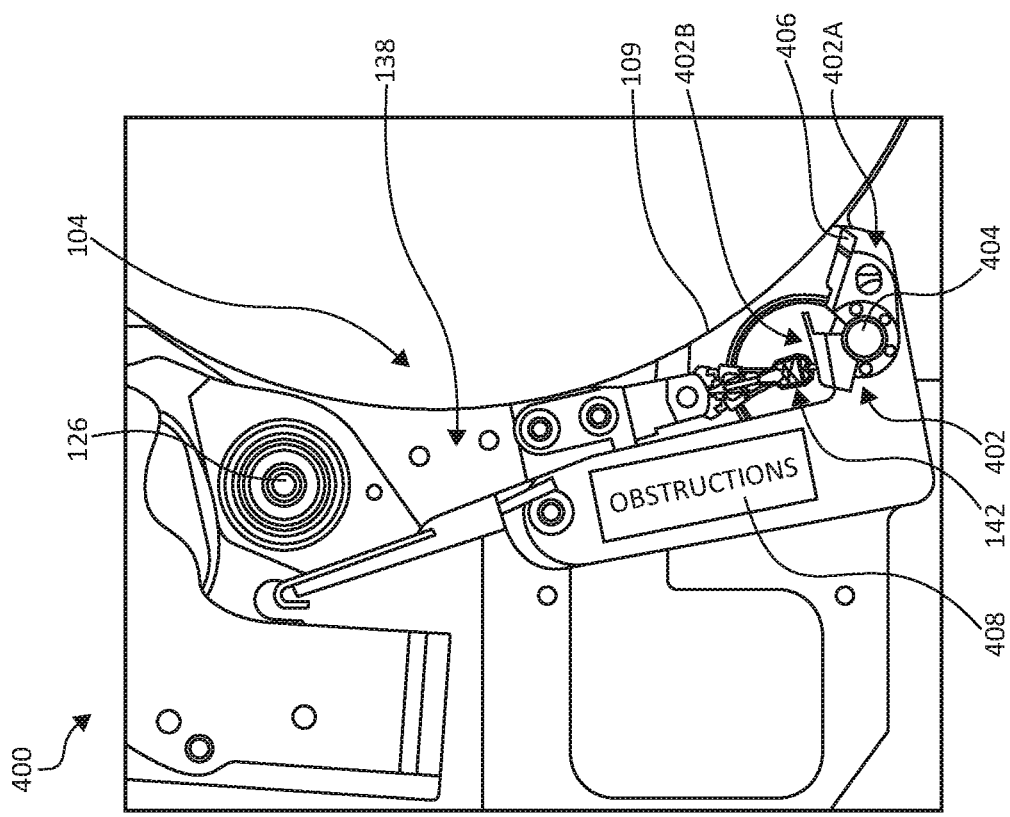
FIGS. 4A and 4B are top views of a portion of a data storage device that employs a split ramp in accordance with one embodiment.
Figure 4B:
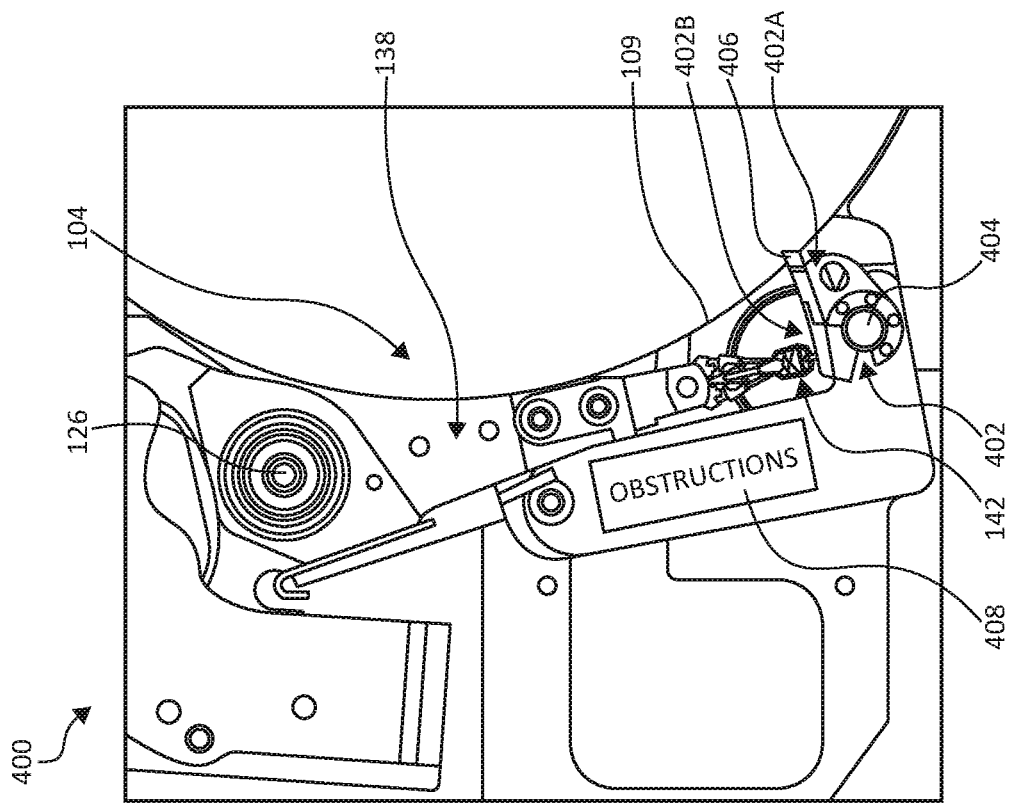

FIGS. 4A and 4B are top views of a portion of a data storage device 400 that employs a split ramp in accordance with one embodiment. In the embodiment of FIGS. 4A and 4B, a split ramp 402 is included adjacent to one or more discs 104. As in the case of split ramp 136 of FIG. 1, split ramp 402 is employed for supporting head end 142 of HSA 138 when the HSA 138 is rotated away from the data storage disc(s) 104. Split ramp 402 includes a first ramp portion 402A adjacent to the OD 109 of the data storage disc(s) 104 and a second ramp portion 402B adjacent to the first ramp portion 402A. As can be seen in FIGS. 4A and 4B, the first ramp portion 402A may be between the second ramp portion 402B and the OD 109. In different embodiments, at least one of the first ramp portion 402A or the second ramp portion 402B is independently moveable.

In some embodiments, the first ramp portion 402A may be moveable away from the OD 109. In the embodiment of FIGS. 4A and 4B, first ramp portion 402A is rotatably movable about pivot 404. During normal use/operation of data storage device 400, the first ramp portion 402A is positioned with its edge 406 over the OD 109 as shown in FIG. 4A to enable parking of head end 142 on the first ramp portion 402A. However, when first ramp portion 402A is positioned with its edge over the OD 109, one or more of discs 104 cannot be easily replaced. Thus, to enable replacement of one or more discs 104, first ramp portion 402A may be rotated about pivot 404 to the position shown in FIG. 4B. It should be noted that, prior to rotating the first ramp portion 402A to the position shown in FIG. 4B, the HSA 138 is rotated about axis 126 until head end 142 of the HSA 138 is supported on the second ramp portion 402B. A maximum limit of rotation of the HSA 138 away from the disc(s) 104 may be set by providing a suitable obstruction 408. With head end 142 of the HSA 138 supported on the second ramp portion 402B, and the first ramp portion 402A in the rotated position shown in FIG. 4B, one or more discs 104 may be easily replaced. Such an embodiment enables the replacement and addition of one or more discs 104 without disassembling the HSA 138.

FIGS. 5A-5C are diagrammatic illustrations of a portion of a data storage device 500 that employs a split ramp in accordance with one embodiment. FIGS. 5A and 5C are perspective views and FIG. 5B is a top view. As in the case of the embodiment shown in FIGS. 4A and 4B, data storage device 500 of FIGS. 5A-5C employs a split ramp 502 that includes a first ramp portion 502A and a second ramp portion 502B. Unlike the rotatably moveable first ramp portion 402A of FIGS. 4A and 4B, first ramp portion 502A of FIGS. 5A-5C is retractably moveable away from the OD 109 of disc(s) 104. FIGS. 5A and 5B show the first ramp portion 502A in a non-retracted position. To enable retraction of the first ramp portion 502A away from the OD 109 to a retracted position (not shown), the first ramp portion 502A is mounted on a flexure 504. In some embodiments, as shown in FIG. 5B, flexure 504 may be actuated by exerting a force (F) on flexure portion 506 in direction 508. The actuation may be provided by an actuation mechanism (not shown) within the data storage device 500 or external to the data storage device 500. FIG. 5C illustrates a bottom perspective view that shows that the first ramp portion 502A and the second ramp portion 502B have overlapping portions 510 and 512 that enable the head end 142 of the HSA 138 (e.g., lift 514) to transition between the first ramp portion 502A and the second ramp portion 502B. As indicated earlier, prior to retracting the first ramp portion 502A away from the OD 109, the HSA 138 is rotated about axis 126 (shown in FIG. 5A) until head end 142 of the HSA 138 is supported on the second ramp portion 502B. A maximum limit of rotation of the HSA 138 away from the disc(s) 104 may be set by providing a suitable stop 516 (shown in FIGS. 5A and 5B).

In the embodiments described above in connection with FIGS. 4A, 4B and 5A-5C, the second ramp portion 402B, 502B may be fixed/stationary if the number of heads is equal to the number of disc surfaces and, thus, no up and down movement takes place. When the number of heads is less than the number of discs, the second ramp portion 402B, 502B is configured to be moved up and down. Thus, in some embodiments, the first ramp portion 402A, 502A is configured to be rotated/retracted, and the second ramp portion 402B, 502B is configured to be moved up and down by, for example, an elevator (not shown in FIGS. 4A-5C) in accordance with the embodiments of FIGS. 1 and 2.

In some embodiments, split ramps may be employed in "jukebox" data storage devices where a portion of the split ramp may be retracted/rotated to mount any of a plurality of selectable discs onto the spindle. After the disc is suitably mounted, the split ramp can be moved back to its non-retracted/non-rotated original position to ready the device for read/write operations.

The above-described embodiments are directed to data storage devices that employ a single disc or a single stack of discs rotated by a single spindle motor. However, as will be described below, split ramps may be employed in data storage device embodiments that include different discs or disc stacks that may be rotated by different spindle motors.

Figure 6:
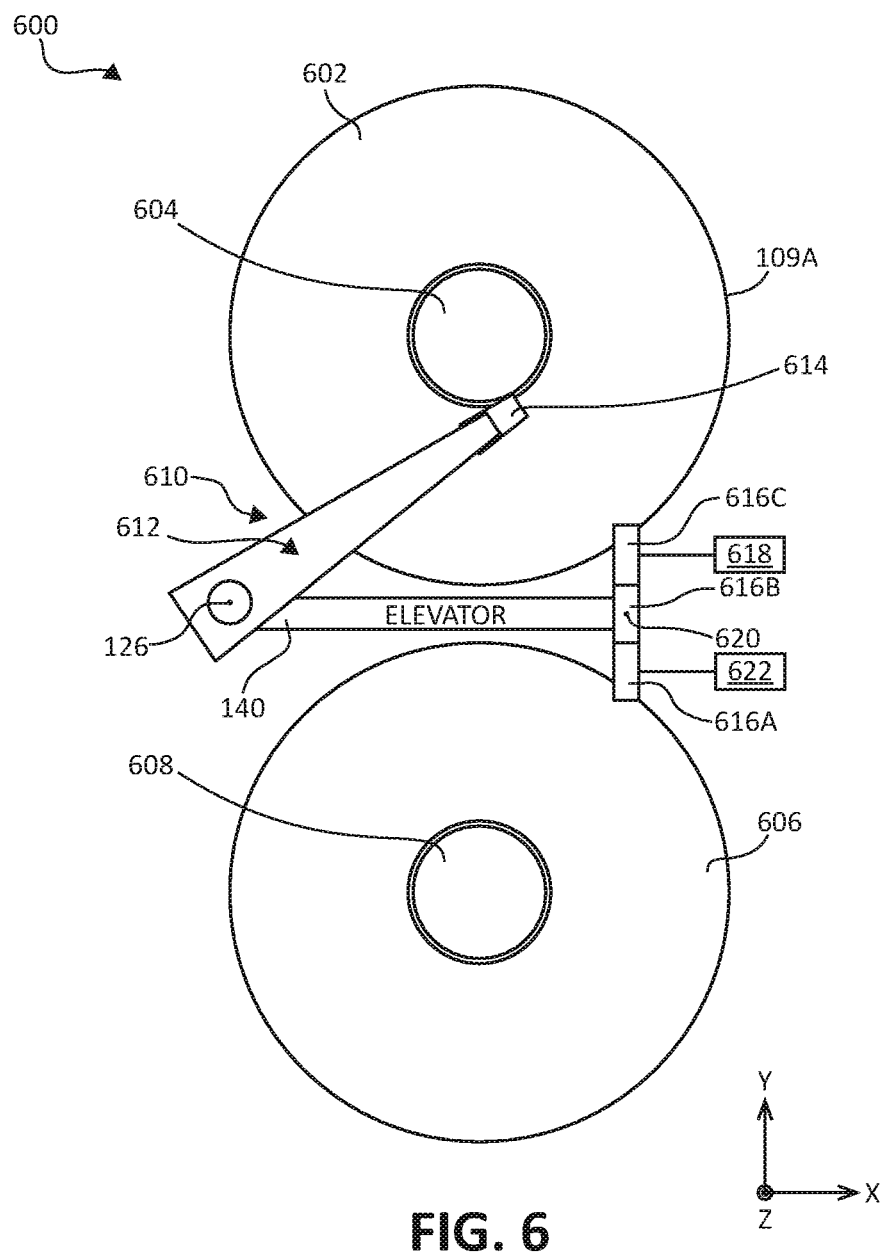
FIG. 6 is a top view of a data storage device, which includes different disc stacks mounted on different spindles, and includes a split ramp in accordance with one embodiment.

FIG. 6 is a top view of a data storage device 600, which includes different disc stacks mounted on different spindles and includes a split ramp in accordance with one embodiment. Data storage device 600 includes a first disc stack 602 mounted on a first spindle 604 and a second disc stack 606 mounted on a second spindle 608. A single HSA 610 including at least one actuator arm 612 and one or more heads 614 rotates about axis 126 such that heads 614 can communicate with disc surfaces in both first disc stack 602 and second disc stack 606. In some embodiments, at least one of disc stacks 602 and 606 includes a number of disc surfaces that is greater than a number of heads 614. In such embodiments, to enable the fewer number of heads 614 to communicate with all the disc surfaces, and to enable the replacement of discs in stacks 602 and 604 without the disassembly of HSA 610, data storage device 600 includes a split ramp 616 that includes three independently moveable ramp portions 616A, 616B and 616C. The first ramp portion 616A is either rotatably moveable away from first OD 109A or retractably moveable from the first OD 109A by a rotation/retraction mechanism schematically shown as block 618. The second ramp portion 616B is moveable along an axis 620 perpendicular to the first disc stack 602 and the second disc stack 606 (Z-direction in FIG. 6). The second ramp portion 616B is moved in unison with HSA 610 by elevator 140. The third ramp portion 616C is either rotatably moveable away from second OD 109B or retractably moveable from the second OD 109B by a rotation/retraction mechanism schematically shown as block 622.

Figure 7:
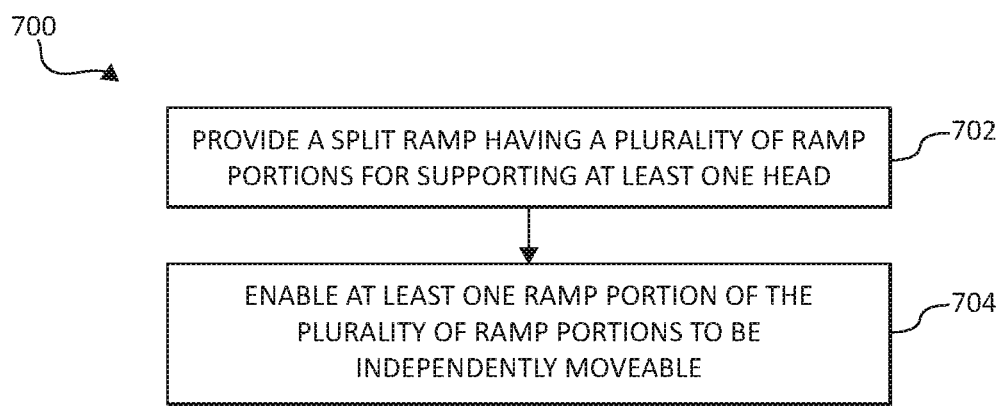
FIG. 7 is a flow chart in accordance with a method embodiment.

FIG. 7 is a simplified flow diagram of a method 700 in accordance with one embodiment. The method includes, at 702, providing a split ramp having a plurality of ramp portions for supporting at least one head. The method also includes, at 704, enabling at least one ramp portion of the plurality of ramp portions to be independently moveable. The method may be carried out in devices of the type described above in connection with FIGS. 1-6.

It should be noted that, although the above disclosure regarding FIGS. 1-6 primarily describes head-support actuators as rotary actuators, linear actuators may instead be used in some embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   at least one head supported by an actuator arm, the at least one head configured to interact with at least one data storage disc when positioned over the at least one data storage disc; and
   a split ramp for supporting the at least one head when the at least one head is moved away from the at least one data storage disc, the split ramp having a first ramp portion adjacent to a first outer diameter (OD) of the at least one data storage disc and a second ramp portion adjacent to the first ramp portion, such that the first ramp portion is between the second ramp portion and the first OD;
   wherein both of the first ramp portion and the second ramp portion are moveable independently of each other.

2. The data storage device of claim 1 and further comprising the at least one data storage disc having the first OD, and wherein the at least one data storage disc comprises a first plurality of data storage discs having a plurality of N data storage surfaces, and wherein the at least one head comprises a plurality of M heads supported by a plurality of arms, with M being less than N, and wherein the plurality of M heads and the plurality of arms are a part of a head stack assembly.

3. The data storage device of claim 2 and further comprising a second plurality of data storage discs spaced apart from the first plurality of data storage discs, wherein the plurality of M heads are configured to communicate with both the first plurality of data storage discs and the second plurality of data storage discs.

4. The data storage device of claim 3 and wherein the split ramp further comprises a third split ramp portion adjacent to a second OD of the second plurality of discs, such that the third ramp portion is between the second ramp portion and the second OD.

5. The data storage device of claim 4 and wherein:
   the first ramp portion is either rotatably moveable away from the first OD or retractably moveable from the first OD;
   the second ramp portion is moveable along an axis perpendicular to the first plurality of data storage discs and the second plurality of data storage discs; and
   the third ramp portion is either rotatably moveable away from the second OD or retractably moveable from the second OD.

6. The data storage device of claim 1 and wherein:
   the first ramp portion is either rotatably moveable away from the first OD or retractably moveable from the first OD; and
   the second ramp portion is moveable along an axis perpendicular to the at least one data storage disc.

7. The data storage device of claim 1 and wherein the split ramp comprises a third ramp portion with the second ramp portion positioned between the first ramp portion and the third ramp portion, and wherein the first ramp portion is a rotatably moveable ramp portion or a retractably moveable ramp portion, and wherein the second ramp portion is movable along a vertical axis, and wherein the third ramp portion is a rotatably moveable ramp portion or a retractably moveable ramp portion.

8. The data storage device of claim 1 and wherein the first ramp portion is moveable away from the first OD.

9. The data storage device of claim 8 and wherein the first ramp portion is rotatably moveable away from the first OD.

10. The data storage device of claim 8 and wherein the first ramp portion is retractably moveable from the first OD.

11. The data storage device of claim 1 and comprising an elevator operably connected to the actuator arm and to the second ramp portion, wherein the elevator is configured to move the actuator arm and the second ramp portion in unison.

12. A data storage device comprising:
   at least one head supported by an actuator arm, the at least one head configured to interact with at least one data storage disc when positioned over the at least one data storage disc;
   a split ramp for supporting the at least one head when the at least one head is moved away from the at least one data storage disc, the split ramp having a first ramp portion adjacent to a first outer diameter (OD) of the at least one data storage disc and a second ramp portion adjacent to the first ramp portion, such that the first ramp portion is between the second ramp portion and the first OD;

wherein the first ramp portion is moveable away from the first OD; and an elevator operably connected to the actuator arm and to the second ramp portion, wherein the elevator is configured to move the actuator arm and the second ramp portion in unison.

13. The data storage device of claim 12 and wherein the first ramp portion is rotatably moveable away from the first OD.

14. The data storage device of claim 12 and wherein the first ramp portion is retractably moveable from the first OD.

15. The data storage device of claim 12 and further comprising the at least one data storage disc having the first OD, and wherein the at least one data storage disc comprises a first plurality of data storage discs having a plurality of N data storage surfaces, and wherein the at least one head comprises a plurality of M heads supported by a plurality of arms, with M being less than N, and wherein the plurality of M heads and the plurality of arms are a part of a head stack assembly.

16. The data storage device of claim 15 and further comprising a second plurality of data storage discs spaced apart from the first plurality of data storage discs, wherein the plurality of M heads are configured to communicate with both the first plurality of data storage discs and the second plurality of data storage discs.

17. The data storage device of claim 16 and wherein the split ramp further comprises a third split ramp portion adjacent to a second OD of the second plurality of discs, such that the third ramp portion is between the second ramp portion and the second OD.

18. A data storage device comprising:

at least one head supported by an actuator arm, the at least one head configured to interact with at least one data storage disc when positioned over the at least one data storage disc; and a split ramp for supporting the at least one head when the at least one head is moved away from the at least one data storage disc, the split ramp having a first ramp portion adjacent to a first outer diameter (OD) of the at least one data storage disc and a second ramp portion adjacent to the first ramp portion, such that the first ramp portion is between the second ramp portion and the first OD; and an elevator operably connected to the actuator arm and to the second ramp portion, wherein the elevator is configured to move the actuator arm and the second ramp portion in unison;

wherein the first ramp portion is stationary and the second ramp portion is moveable by the elevator along an axis perpendicular to the at least one data storage disc.

19. The data storage device of claim 18 and further comprising the at least one data storage disc having the first OD, and wherein the at least one data storage disc comprises a first plurality of data storage discs having a plurality of N data storage surfaces, and wherein the at least one head comprises a plurality of M heads supported by a plurality of arms, with M being less than N, and wherein the plurality of M heads and the plurality of arms are a part of a head stack assembly.

* * * * *